(No Model.)
J. G. GAY.
TWO WHEELED VEHICLE.
No. 260,474. Patented July 4, 1882.
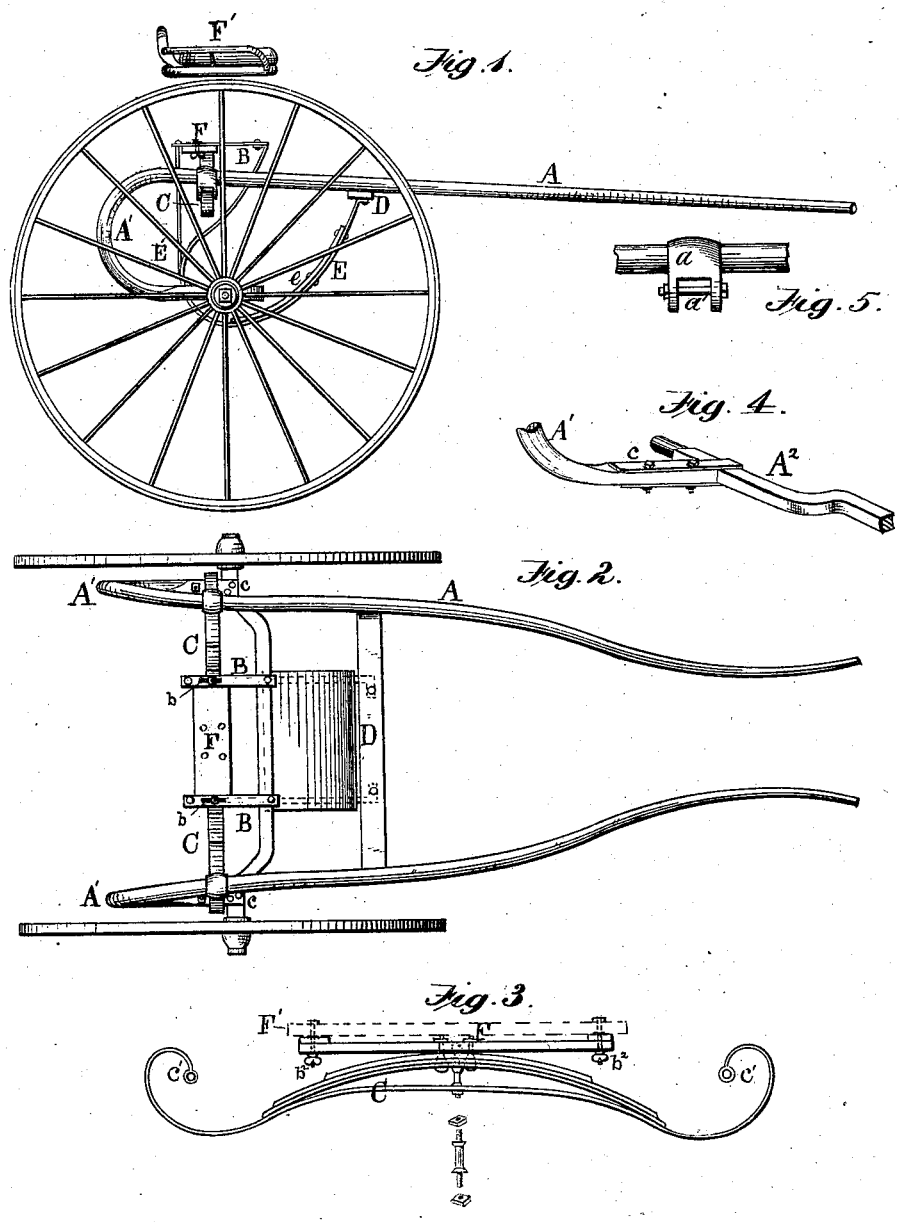
WITNESSES
INVENTOR
N. PETERS, Photo-Lithographer, Washington, D. C.

UNITED STATES PATENT OFFICE.

JOSHUA G. GAY, OF OTTAWA, ILLINOIS.

TWO-WHEELED VEHICLE.

SPECIFICATION forming part of Letters Patent No. 260,474, dated July 4, 1882.

Application filed April 13, 1882. (No model.)

*To all whom it may concern:*

Be it known that I, JOSHUA G. GAY, a citizen of the United States of America, residing at Ottawa, in the county of La Salle and State of Illinois, have invented certain new and useful Improvements in Vehicles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in shaft-vehicles, such as sulkies, trotting-carts, &c.; and it consists in certain devices and their combination, which will be hereinafter more particularly described, and set forth in the claims.

Figure 1 is a side view of a sulky with my improvements attached. Fig. 2 is a plan view of Fig. 1. Fig. 3 is an elevation of the spring and seat-frame. Figs. 4 and 5 are details of parts which will be referred to in the general description.

A represents the shafts of the vehicle, which have a backward curve, A', and the ends of which are secured firmly to the axle-tree $A^2$ by the strap $c\,c$, bolted to the ends of the shafts and clasping the square part of the axle, as seen in Fig. 4.

C is the spring, which is coiled at each end. By the eyes $c'\,c'$ the spring is hung to the shafts A A in clips $a\,a$ by bolts $a'$, Fig. 5.

D is the cross-bar, which is secured to the shafts. Underneath it are springs E E, which are bolted to the under side of the cross-bar D, which curve downwardly under the axle, and then pass around the axle and upward to the front ends of the bars B B, which are fastened to the seat-board F.

On the inside of springs E E there is a foot-board, $e$, bolted to them, as seen in Fig. 1. At the curves of springs E E there are standards E', which pass up to the seat-bars B B, to which they are bolted. These bars or straps B B have a slot, $b$, in them, and the seat F', which is represented above the wheel, Fig. 1, is secured to these bars B B by bolts passing through the slots $b\,b$, having thumb-nuts $b^2$ underneath, the purpose of which is to shift the seat backward or forward, as may be requisite to balance the shafts according to the weight to be carried.

The advantages resulting from these several improvements are as follows, viz.: The curving of the shafts and their extension back of the axle bring the position of the scroll-spring E upon the shafts for the support of the weight of the driver at the point where the weight will be properly balanced. The foot-board $e$, being attached to the springs E E, which are fixed to the seat will have the same motion as the seat on the cross-spring C. The seat being made adjustable by means of the slots in the seat-frame, the weight of the driver can be properly adjusted backward or forward.

I claim—

1. In shafts for vehicles, the backward curve extending behind and secured to the rear of the axle, substantially as and for the purpose described.

2. In vehicles, the coiled spring for the support of the seat, hung upon the shafts in the position substantially as and for the purpose described.

3. The combination of the seat-frame, the adjustable seat, and transverse spring supported in the position upon the shafts, substantially as and for the purpose described.

4. The combination of the seat-frame, the springs E E, supporting the foot-board, the back standards, E' E', and the coiled spring, substantially as and for the purpose described.

In testimony whereof I affix my signature in presence of two witnesses.

JOSHUA G. GAY.

Witnesses:
P. TALBOT,
J. SAMPLE.